Feb. 7, 1933.  E. D. EBY  1,896,841
FLUID STOP JOINT FOR SHEATHED HIGH TENSION CABLES
Filed Aug. 8, 1928
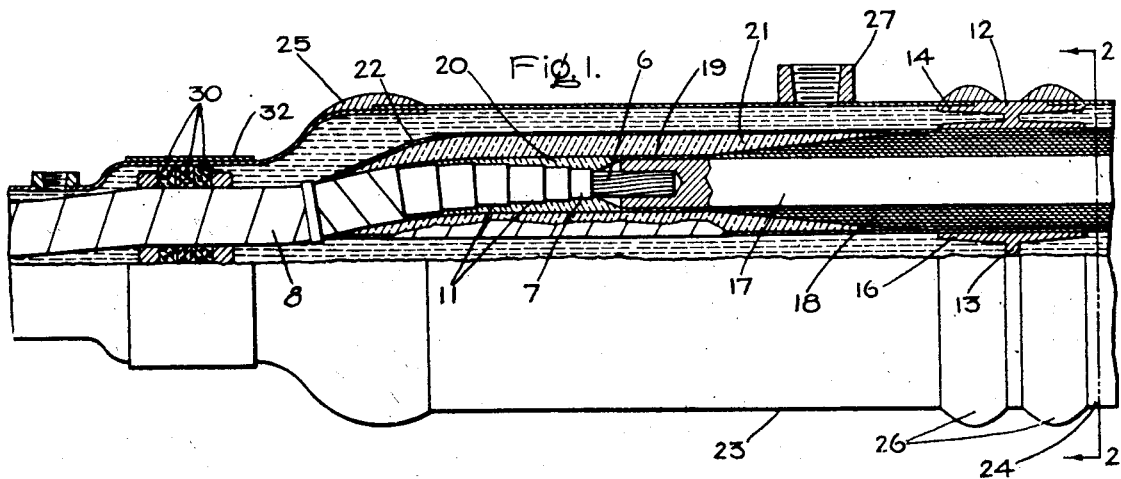
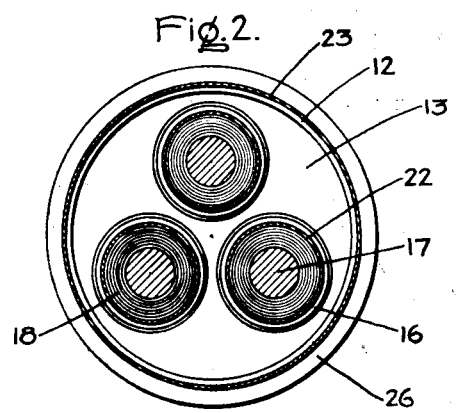
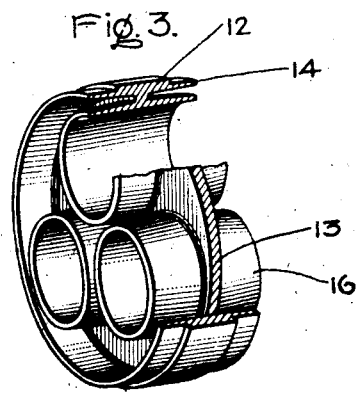
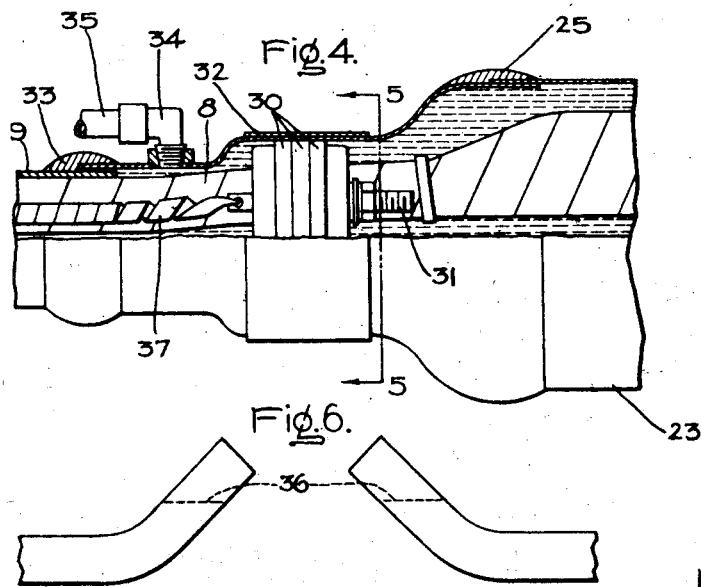
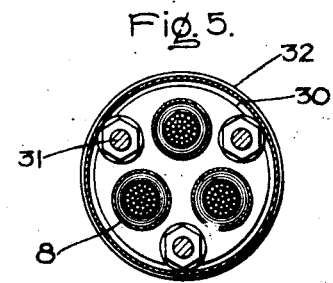
Inventor:
Eugene D. Eby,
by Charles A. Mullen
His Attorney Patented Feb. 7, 1933

1,896,841

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

FLUID STOP JOINT FOR SHEATHED HIGH TENSION CABLES

Application filed August 8, 1928. Serial No. 298,357.

Sheathed high tension underground cable of the oil-filled type is made in sections or lengths and is laid below the surface of the ground, generally in conduits made of tile or concrete, and follows approximately the contour of the area over which it is laid, the sections of the cable being electrically united by suitable joints or splices. Where the profile of the area contains hills and valleys, it is desirable in many instances and necessary in others, to provide in addition to the joints for electrically uniting parts of the cable what are termed stop joints, which limit the hydrostatic head of oil in any one or more sections to a predetermined value. In such an installation the passage of even a very small amount of oil from one section to another may very greatly increase the pressure in the receiving section, and even cause a rupture of its sheath.

My invention has for one of its objects the provision of a fluid stop joint of improved construction for fluid-filled cables, particular reference being made to the means for preventing fluid leakage from one side to the other of the joint and to the simplification of the joint as a whole.

A further object of my invention is to provide a simple yet effective means for preventing fluid from flowing out of the ends of oil filled cable after an end covering or cap has been removed to permit of joining or splicing one section with another.

For a consideration of what I believe to be novel and my invention, attention is directed to the accompanying description and the claims appended thereto.

In the attached drawing which is illustrative of my invention, Fig. 1 is a longitudinal view partly in section of a high tension cable joint; Fig. 2 is a cross section view taken on line 2—2 of Fig. 1; Fig. 3 is a perspective view of the metal partition or barrier within the joint; Fig. 4 is a view of a seal or dam employed to prevent leakage of fluid from the cable during the jointing operation, Fig. 5 is a view in cross-section and showing the dam in elevation, and Fig. 6 is a view illustrating a modified form of dam.

As illustrated in the present embodiment there are three conductors 6 which are made of stranded copper, having a round or other suitable section. It is to be understood, however, that only one conductor may be provided or a greater number. Each conductor is suitably insulated as by tightly wrapped-on paper 7 for example. Each conductor and its insulation is or may be tightly bound by a thin metal tape 8 usually perforated. The several conductors with their tapes are or may be bound together by a thin steel tape which in turn is surrounded by a sheath 9, of lead, for example. Between the several conductor insulations and the inner wall of the sheath suitable fillers are or may be provided. Such fillers when used should not, however, prevent the free flow of insulating fluid, such as thin oil, into and through the paper insulation.

In order to join or splice the conductor of one section with those of another they are spread outwardly at their ends to afford sufficient space to permit of jointing and re-insulating. The insulation at the end of each conductor is wholly removed for a short distance, and for a short distance back thereof the insulation is removed in a manner to form a series of steps 11.

12 indicates a metal partition which divides the finished joint into two parts. It has a central web 13 and a peripheral flange 14 which overhangs the web, the purpose of the flange being to receive and support the opposed ends of the joint enclosing casing and stiffen the structure as a whole. The web is provided with as many axially-extending machined holes or openings as there are conductors and suitably shaped to conform thereto. On each side of the web are provided deep bosses or flanges 16, in each of which is a hole that conforms in shape to a conductor and in size to the insulation thereon. The effect of the bosses at each opening is to provide a long bearing surface so as to ensure a tight joint with the insulation on the conductor means. 17 indicates a copper rod of which there are as many as there are conductors. The rods pass through the partition, are insulated therefrom and are united at their ends with the conductors of the cable sections. It is important that the insulation used for the rods shall not be brittle or easily broken but on the other hand shall be tough, durable and have the requisite degree of elasticity for unequal expansions of the parts. To meet these exacting conditions each rod is wrapped with many turns of fibrous insulation 18 which insulation is later carefully finished to dimensions. Craft paper which has been previously coated with a condensation product or equivalent material will be satisfactory. The insulation is thickest where it passes through the partition and gradually tapers to nothing near the ends of the rods. The paper is rolled on as tight as possible so as to prevent voids and wrinkles between layers, after which the condensation product or other binder is properly cured or hardened. The insulation is then machined to the shape illustrated. The advantage of using such a binder among other things resides in the fact that it renders the paper impervious to oil or other liquid used as an insulating material. As has been previously pointed out these stop joints are provided in a cable system to definitely and positively limit the hydrostatic head to which a given section may be subjected, for example, to limit the pressure to which a section occupying an incline position on a hill side can be subjected. If there be a leak, even a very small one, such as would be occasioned by the slow migration of oil through the paper or through the joint between the peripheral surface of the paper and the metal wall of the partition, said leak will ultimately cause an abnormal pressure on the low side of the joint resulting finally in stretching or bursting of the cable sheath. Additional features of advantage of my improved construction are that the insulation will not be broken even when subjected to rough handling, and that the partition and insulated connector means can be made and assembled in the factory where full facilities for accurate work are available, as distinguished from preparing the parts at the point of installation. That portion of the insulation which is located within the web 13 and bosses 16 of the partition is machined or otherwise finished to a size slightly larger than the opening in the web and prior to being mounted in place is given a coat of suitable varnish which ensures a good joint and facilitates the pressing operation. Each rod with its insulation is then mounted with a forced fit in the web, a suitable fixture conforming in shape to the tapered part of the insulation being used in this operation to prevent injury to the insulation. With the type of joint illustrated the end pressure exerted on a rod to force it into place may be of the order of three tons.

Under the conditions mentioned the insulation on the rod is held at all times under heavy compression between the rod and the wall defining the opening in the web and bosses. As the rod heats due to the flow of current therein it expands radially and this is compensated for by using paper insulation and a binder which have the necessary degree of elasticity. By making the bearing surface between the flanges on the web and the insulation on the rod of relatively large area the pressure on the insulation is well distributed and is not excessive per unit area. The particular point to be observed is that the insulation shall always be under compression notwithstanding any unequal expansion or contraction of the parts.

The ends of each rod are drilled to form sockets 19 to receive the exposed ends of the corresponding conductors. After the parts are assembled the conductors and rods are united with solder. In many cases it will be found advantageous to slot the wall of the socket to facilitate the entrance of the solder.

After the soldering operation the parts are individually covered or reinsulated with tightly wrapped-on tapes 20 and 21 which may with advantage be made of varnished fabric. In this way the insulation is built up to a diameter corresponding to that on the center of the rod, which diameter is greater than that of the insulation on the conductors. Over the tape 21 is wrapped a metallic strip or braid, 22, which forms a continuation of the metallic shielding tape 8, the latter being wrapped around the insulation on the conductor and is in electrical and mechanical contact with the inner wall of the sheath. The other end of the braid is soldered or otherwise secured to the partition 12. In this manner the electrical stresses on the insulations are properly distributed and electrical continuity of the shielding means obtained from one section to the next.

The joint is enclosed in a casing comprising two principal parts 23 and 24 each of which is soldered at 25 as by wiped joints to a sheath or other part of the casing and at 26 to the peripheral flange on the partition. Each part of the casing is provided with a screw-threaded opening 27 to receive a pipe leading to a source of oil supply or it may receive a closing plug as desired. In this manner the chamber formed between the dam and the stop joint can be properly filled with oil.

With an oil-filled cable it is evident that when the end caps or closures of the sections are removed preparatory to splicing or jointing, the oil contained within the sheath at its exposed end will flow out. To prevent this flow the ends of the cable sections are temporarily bent upward before they are opened and a dam of suitable construction is inserted in each end, a sufficient part of the sheathing being removed for the purpose. Such a dam is shown in Figs. 4 and 5 wherein 30 indicates cork or equivalent disks of which three are shown. Each of these has as many properly-spaced and sized openings as there are conductors and are slipped over them and occupy the position shown in Fig. 4. On each side of the assembled disks is a clamping plate and extending through the plates and disks are short bolts 31 which are headed on the inner ends and have nuts on the outer. By firmly screwing the nuts against the plates the cork disks are caused to expand and engage the inner wall of that portion of the joint casing immediately surrounding it, and at the same time the walls of the openings are caused to firmly grip the insulation around the conductors. Such a dam, while it may not always be entirely fluid-tight, is sufficiently so to permit of the jointing or splicing operations without permitting the escape of any appreciable amount of insulating fluid. The portion 32 of the joint casing which surrounds the dam is so arranged that it can be slipped back over the sheath while the dam is being assembled in position. After the dam is properly assembled the casing part 32 is united with the sheath by a wiped soldered joint 33. Loss of oil in back of the dam due to leakage from any cause may be supplied through the fitting 34 and a supply pipe 35. The paper insulation which surrounds each of the conductors is covered with a tightly wrapped metal tape 8 which is or may be perforated to permit the oil to freely penetrate the paper. 37 indicates channels made of coiled metal strips generally similar to the covering used on so-called BX cable. The ends of the strips are fastened to the bolts 31 to establish electrical connection therewith and the walls of said channels are in electrical and mechanical contact with the metal tape 8.

Instead of the dam specifically illustrated, other forms of dams may be employed as for example, they may be of paraffin or equivalent compound. When these are employed the procedure may be as follows:—about twenty to twenty-four inches of the cable ends are bent upwardly to an angle of approximately 45° from their normal horizontal positions, as shown in Fig. 6, after which the end caps are removed and the raised portions drained of oil as by means of a siphon. Molten paraffin or equivalent compound is then poured into the ends of the cable in sufficient amount to form dams when solidified. The level of the paraffin is indicated by the dotted line 36. After this the cable ends are bent down into alignment and the splicing operations carried out as previously specified. After the splicing is completed the paraffin may be removed either by heating the cable slightly and draining it out or dissolving the compound into the oil. Paraffin is soluble in oil, and its presence is not detrimental to the insulating qualities of the oil.

The oil stop joint herein described has the advantage that the parts can be made in the factory where every facility is afforded for accurate work and proper testing, and also that it simplifies the work of the jointer at the place of installation of the cable. These are very substantial advantages because the cables are installed underground and the joints have to be made in relatively small manholes which are usually damp and where the workman is greatly restricted in his operations.

Mounting the rods 17 permanently in the partition and as a part of a factory operation eliminates all danger of a jointer's sealing the outer casing while permitting a leak to exist through the partition. In this connection it is to be remembered that a leak cannot be detected until after the joint is completed and the casing sealed to the sheaths, and even then it is not a simple matter to detect small leaks.

What I claim as new and desire to secure by Letters Patent of the United States, is:

1. A stop joint for fluid-filled cable, comprising sheathed cable sections containing fluid, a metal partition which has as many openings as there are conductors, rods which extend through the openings and are united with the conductors, insulation which surrounds each of the rods, extends through an opening and is held under radial compression between the rod and the wall of the opening, a casing for the joint which is sealed fluid-tight to the partition and also to the sheaths, and a dam located on each side of the partition to prevent the cable sections from draining.

2. A stop joint for fluid-filled cable, comprising sheathed cable sections containing fluid, a metal partition which has as many openings as there are conductors, rods which extend through the openings and are united with the conductors, insulation which surrounds each of the rods and extends through an opening and is held under radial compression between the rod and the wall of the opening, a casing for the joint which is sealed fluid-tight to the partition and to the sheaths, a dam located on each side of the partition to prevent the cable sections from draining, each said dams comprising a disk of elastic material through which the insulated conductors extend, and means for compressing the disks whereby they are caused to expand and firmly engage the inner wall of the sheath and also the insulation around the conductors.

3. A stop joint for fluid filled cable, comprising sheathed cable sections containing fluid, shields for the conductors, a metal partition having axially extending openings affording large bearing surfaces, rods which extend through the openings and are connected, each to a pair of conductors, fibrous insulation which tightly surrounds each of the rods and is held under heavy radial compression by the wall of its opening, a divided casing for the joint, the parts of which are sealed fluid tight to the metal partition and to the sheaths, insulation surrounding the ends of the rods and the conductor ends, and a shield which extends over said insulation and is electrically connected to the shields on the conductors and to the metal partition.

4. A stop joint for fluid filled cable comprising sheathed cable sections each containing insulated conductors and a body of fluid, a transverse metal partition having spaced openings, solid conductor rods extending through the openings, the ends of each rod being connected to conductors, an insulating body of fibrous material tightly and directly wrapped around each of the rods in layers and initially of a size slightly greater than its opening in the surrounding metal of the partition so that when forced into said opening it is permanently held under radial compression, thereby preventing leakage when the insulation and the metal surrounding it expand unequally, a hardened binder uniting the layers of fibrous material forming each of the bodies to each other and to its rod, a divided casing, the adjacent ends being united with the partition and the outer ends with the sheaths of the cable sections, and bodies of fluid within the casing which are separated by the partition.

5. A stop joint for oil filled cable comprising sheathed cable sections each containing insulated conductors and a body of oil, a transverse metal partition having spaced openings, solid conductor rods extending through the openings, an insulating body of fibrous material tightly wrapped around each of the rods in layers, said body being thickest in the center and tapering therefrom toward the ends and being permanently held under such radial compression by the enclosing metal of the partition as to prevent leakage at the joint between them when the insulation and metal partition expand differentially, an oil proof binder for uniting the layers of material forming the bodies to each other and to its rod, means uniting the ends of the cable with the rods, bodies of wrapped on insulation covering said means and the bodies of insulation on the conductors and those on the rods, an enclosing casing united with the cable sheaths and the partition, and bodies of oil in the casing which are separately maintained by the partition.

6. A stop joint for fluid filled cable comprising sheathed cable sections each containing insulated conductors and a body of fluid, the insulation on the conductors of the cable being reduced in thickness step-by-step toward their ends, a transverse metal partition having spaced openings, solid conductor rods extending through the openings, sockets formed in the ends of each rod to receive conductor ends, an insulating body of slightly elastic fibrous insulating material cemented to and wrapped around each rod in concentric layers, said body being thickest at the center and tapering both ways therefrom to the ends, said body being held under heavy permanent radial pressure by the surrounding metal of the partition, a body of insulation wrapped around the stepped insulation on each conductor to the level of the rod, a second body of wrapped on insulation surrounding the first and covering the same to the approximate size of the body of fibrous material on the rod at one end and terminating at the approximate diameter of the conductor insulation at the other, an enclosing metal casing sealed fluid tight to the conductor sheaths and the partition, and separate bodies of insulating fluid within the casing on opposite sides of the partition.

7. A stop joint for fluid filled cables comprising metal sheathed cable sections each containing insulated conductors and a body of fluid, a transverse metal partition having openings, solid conductor rods extending through the openings and having sockets to receive the conductor ends, a body of fibrous material tightly and directly wound on the rods layer-by-layer and compressed by the wall of the opening to a degree greater than that due to the unequal expansion of the parts, insulating material covering the ends of the cable conductors and those of the rods, metallic shielding tapes on the conductors and in electrical contact with the sheaths, flexible metal strips wound around the exterior of the insulating material covering the joined ends of the conductors and rods, one end of the strip being connected to a shielding tape and the other end to the metal partition, a metal casing enclosing the joint and sealed to the cable sheaths and the partition, and bodies of oil on opposite sides of the partition in which the insulating material is submerged.

8. A stop joint for fluid filled cables comprising sheathed cable sections each containing insulated conductors and a body of fluid, a transverse metal partition having spaced openings, a solid conductor rod located in each of the openings, a body of insulation tightly and directly wrapped in layers around each rod and being thicker in the center than at the ends and of a diameter initially greater than that of its receiving opening in the metal partition, a hardened binder uniting the layers to each other and to the rod and also serving to prevent migration of fluid through the body of insulation, the central part of the insulation serving to support the rods in the partition and, making a forced fit with the wall of said opening, sockets for conductors formed in the ends of each rod, a body of insulation wrapped around the insulation on each conductor end, its socket and also around the insulation on the rod adjacent the socket, a divided casing secured at its outer end to the cable sheaths and the opposed ends to the partition, and bodies of fluid located within the casing on opposite sides of the partition.

9. A stop joint for fluid filled cables comprising sheathed cable sections each containing an insulated conductor having a metal shielding tape, a casing enclosing the adjacent ends of the sections and secured to the sheaths thereof, a metal partition dividing the casing into chambered parts and provided with an opening, a solid connector rod extending through the opening, an insulating wrapping of fibrous material and a binder on the rod located between it and the wall of the opening for permanently uniting the partition and rod and preventing migration of fluid from one side of the partition to the other, means jointing the ends of the conductors with the ends of the rod, a wrapping of insulating tape around the insulation on the rod and that on the conductor ends, metal tapes wrapped around the insulating tapes and connected at their outer ends to the shielding tapes on the conductors and at their inner ends to the metal partition to complete the shielding of the conductors and the joint, and separate bodies of insulation located in the chambers of the casing outside of said shielding tapes.

10. A joint for fluid filled cables comprising cable sections each having a metal sheath and an insulated conductor, means for jointing the conductors, insulation for the joint, a metal casing enclosing the joint and the opposed ends of the conductors comprising a central portion and a pair of separate end members of lesser diameter over which the central portion may be moved endwise to permit of jointing the conductors, a means jointing the outer end of each member to a cable sheath, other means jointing each of the members to the central portion, a dam located within each of the end members and comprising elastic disks and means extending through the disks for exerting sidewise pressure thereon to cause them to expand and engage the inner wall of the enclosing member, and a fluid filling for the casing.

In witness whereof, I have hereunto set my hand this fourth day of August, 1928.

EUGENE D. EBY.